Feb. 16, 1960     S. BORSETTI     2,925,282
ADJUSTABLE RETAINER DEVICE
Filed April 28, 1958
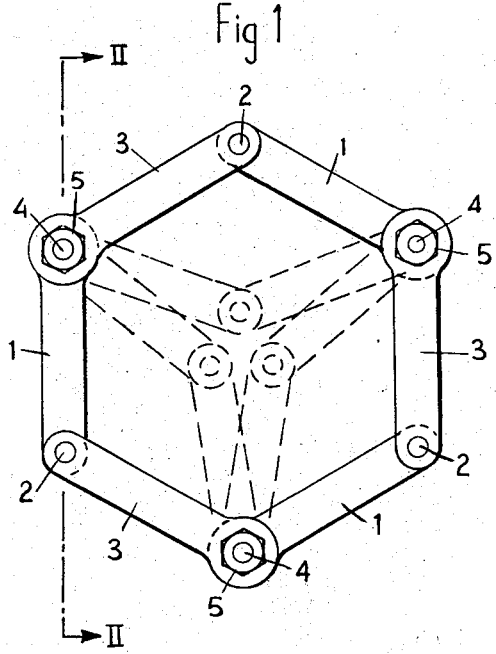
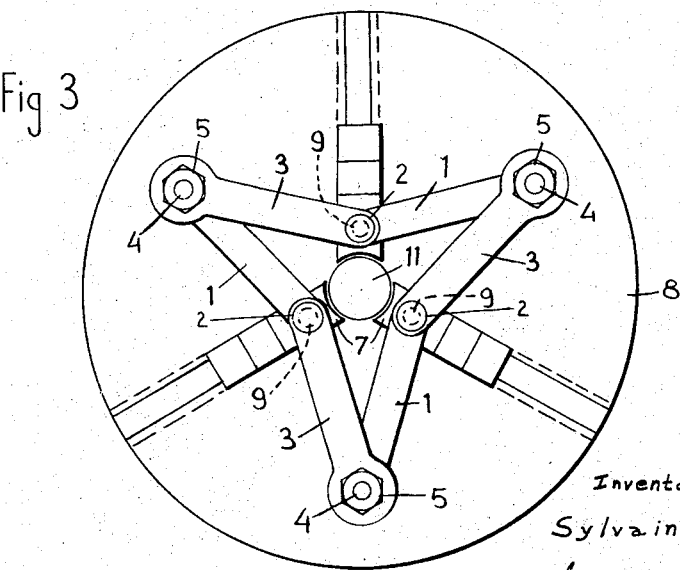
Inventor
Sylvain Borsetti
Bailey, Stephens & Huettig
Attorneys

United States Patent Office 2,925,282
Patented Feb. 16, 1960

2,925,282
ADJUSTABLE RETAINER DEVICE

Sylvain Borsetti, Colombes, France, assignor to Etablissements Sequanais de Fabrication et d'Outillage Mecanique E.S.F.O.M., Clichy, France, a company of France Application April 28, 1958, Serial No. 731,270

Claims priority, application France April 30, 1957

9 Claims. (Cl. 279—123)

The present invention relates to an adjustable device for retaining mechanical parts in a given position, especially for the retention of mild-steel lathe chuck jaws during rectification of such jaws.

In various kinds of engineering work the necessity arises of temporarily retaining relatively movable mechanical parts in a predetermined relative position. For example, this is required when a plurality of separate parts are to be subjected to some common machining operation in a predetermined relative position as assumed by the finished parts in service. One instance, to which the invention is especially useful, is that involving the retention of lathe chuck jaws of the so-called mild-steel or grindable type.

In connection with lathes it is becoming more and more common to use work-holder chucks of the type in which the chuck jaws are made of mild-steel and are capable of being ground true with respect to the blank that is to be supported therein. The use of such rectifiable mild-steel chuck jaws makes it possible to center the workpiece in the lathe more easily and accurately than an ordinary hard steel chuck, especially where the chuck is not new and there is play and backlash in the screw threads.

In order to turn such chuck jaws true, the blank is first inserted into the chuck, to cause the chuck jaws to assume the requisite positions, then the blank is withdrawn and the chuck jaws must be turned true without altering their relative positions, so as to impart to the inner jaw surfaces an accurate contour corresponding to that of the blank.

The means heretofore used in retaining the chuck jaws in their set relative positions usually comprise an annular member provided with radial, inwardly directed screws adapted to engage the outer sides of spindles inserted into holes formed in the jaws parallel to the chuck axis. With such systems however the positioning of the jaw-retainer means is inconvenient since it is required to maintain both the annular member and the spindles in position. Moreover, owing to the relatively small engagement area between the screw tips and the spindles, it is found difficult to set the chuck jaws accurately to the desired settings. Whereas the depth of engagement of the radial screws provides a means of adjusting the effective chuck diameter to the value corresponding to a particular blank, this result cannot be achieved when using a simple or single annular ring member, and more complex means have to be used. An additional drawback of such retainer means is the fact that it consists of a plurality of independent components which are apt to become disassembled.

It is the general object of this invention to provide adjustable retainer devices for relatively movable mechanical parts which will satisfy the various requirements of practice more completely than heretofore.

An exemplary embodiment of the invention will now be described with reference to the accompanying drawings, wherein:

Fig. 1 is a front view of a retainer device according to the invention for maintaining the predetermined relative setting between the three jaws of a lathe chuck or the like during rectification;

Fig. 2 is a section on line II—II of Fig. 1;

Fig. 3 is a front view of a chuck with the device of Figs. 1 and 2 mounted thereon in deformed condition.

It will be understood that the drawings and related descriptive matter is illustrative rather than restrictive.

In the illustrated embodiment the invention is shown as applied as a means for retaining the relative setting of lathe chuck jaws during a truing operation; the chuck jaws are three in number.

Since the chuck jaws herein are three in number the device of the invention comprises six rigid branches such as 1, all similar, and preferably made of steel. The branches are interpivoted to provide a deformable hexagon, every other apex of which has a locating pin 2 projecting from one side of it. In this embodiment the pin 2 is provided by a rivet-like part having a shank freely extending through the branch 1 under consideration and its head abutted against a side of said branch, while said shank is force-fitted through the adjacent branch 3 of the hexagonal assembly.

The remaining apices of the hexagon are each provided with a locking means for firmly clamping together the ends of the branches meeting at said apex, after said three apices 2 have been positioned to the desired settings as described further on.

The locking means herein each consist of a screw stud 4 force-fitted and welded or otherwise secured in one branch of the assembly and extending freely through the adjacent branch, and a nut 5 screwed on the projecting end of said stud.

In order to insure firmer locking of the assembly in the deformed setting, the engaging surface between the nut and the adjacent branch of the assembly engaged by it, may be formed to a suitable tapered shape such as a frustoconical shape as shown in Fig. 2, or as a portion of a sphere.

It will be seen that with the nuts 5 loosened, the branches of the assembly may be freely manipulated to deform the hexagon so that the radial distance between the three studs 2 can be made to correspond to any desired value between a maximum and a minimum. The maximum spacing is obtained when the hexagon is formed to the shape of a regular hexagon as shown in full lines in Fig. 1; and the minimum spacing is had when three apices of the hexagon are touching one another. The broken line contour shown in Fig. 1 illustrates an intermediate shape which is rather close to the minimum-spacing condition.

In using the device described for the truing of the jaws 7 of a lathe chuck 8 as shown in Fig. 3, the following procedure may be used.

A hole or socket 9 is first formed in the front face of each of the three chuck jaws 7 in a direction parallel to the chuck axis. The blank 11 to be turned in the lathe is inserted into the chuck and made fast. The setting then assumed by the usual chuck key is approximately indicated as with a chalk mark in order to permit the same chuck setting to be restored later, and said key is then backed a predetermined amount, e.g. two revolutions, in a direction to open the chuck. The blank 11 is then removed and the device of the invention is connected with the chuck by engaging the three locating pins 2 respectively into the sockets 9 of the chuck jaws, it being understood that the blocking nuts 5 are at this time in loosened condition. The nuts 5 are then tightened, and the chuck key is turned back to the position corresponding to the chalk mark, or preferably somewhat beyond, by an amount corresponding to the difference between the diameter of blank 11 and the actual diameter of the chuck jaws after the truing operation. The chuck jaws are then bored to the desired diameter. The nuts 5 are then again loosened and the retainer device is removed, whereupon the blank 11 can be inserted and clamped in position for the desired turning operation.

It will be seen from the foregoing that the novel device for retaining relatively movable mechanical parts in a predetermined relative position includes a number of advantages some of which are indicated as follows:

It remains at all times in the form of a unitary assembly. It is foldable to a small-size condition. It is very easy and quick to position and remove. It acts to retain the parts in a strictly accurate relative setting.

While I have described herein some embodiments of my invention, I wish it to be understood that I do not intend to limit myself thereby except within the scope of the claims hereto or hereinafter appended.

What I claim is:

1. A device for temporarily retaining a plurality of relatively movable chuck jaws in a predetermined relative position, which comprises a plurality of interpivoted elements defining a deformable polygonal assembly having a number of apices equal to twice the number of said jaws, each said jaws having a locating means provided thereon, cooperating locating means formed on one side of some of said elements interengageable with said locating means on said jaws, and locking means for locking said elements relatively to one another to retain said polygonal assembly in the deformed condition assumed thereby on interengagement of said locating means.

2. A device for temporarily retaining a plurality of relatively movable chuck jaws in a predetermined relative position, comprising a set of interpivoted elements defining a defromable polygonal assembly having a number of apices equal to twice the number of said jaws, each said jaw having a locating depression formed therein, locating pins projecting from one side of said assembly at every other one of said apices interengageable with said respective depressions, and locking means associated with the remaining apices for locking said elements relative to one another in a deformed condition assumed on interengagement of said locating pins and depressions.

3. A device of the type described for temporarily retaining a plurality of relatively movable chuck jaws in a predetermined relative position, comprising a set of interpivoted elements defining a deformable polygonal assembly having a number of apices twice the number of said jaws, each said jaw having a locating depression formed therein, locating pins projecting from one side of said assembly at every other one of said apices interengageable with said respective depressions, and lockable screw means positioned at the remaining apices for locking the elements in a deformed condition assumed on interengagement of said locating pins and depressions.

4. A device as claimed in claim 3, including means for interpivoting said elements comprising pivot pins projecting beyond said one side of the assembly to define said locating pins.

5. A device as claimed in claim 3, including means for interpivoting said elements comprising rivet-like pins each having a head engaging one element and a shank freely extending through said one element and force-fitted through the adjacent element and projecting beyond said adjacent element to provide a locating pin.

6. A device as claimed in claim 3, wherein said blocking means comprises a screw stud secured to one element and freely extending through the adjacent element, and a nut screwed on the projecting end of said stud.

7. A device according to claim 3, wherein said elements have enlarged end portions to provide increased frictional contact between adjacent elements.

8. A device according to claim 1, wherein there are three parts to be retained, and said polygonal assembly is a hexagonal assembly.

9. A device according to claim 6, wherein said nut and said adjacent element have cooperating taper surfaces.

References Cited in the file of this patent
UNITED STATES PATENTS

| 2,304,670 | Argus | Dec. 8, 1942 |
| 2,464,070 | Carcelli | Mar. 8, 1949 |

FOREIGN PATENTS

| 242,843 | Germany | Jan. 22, 1912 |